United States Patent
Kohli

(10) Patent No.: US 11,030,557 B2
(45) Date of Patent: Jun. 8, 2021

(54) PREDICTING ARRIVAL TIME OF COMPONENTS BASED ON HISTORICAL RECEIPT DATA

(71) Applicant: Applied Materials, Inc., Santa Clara, CA (US)

(72) Inventor: Kriteshwar Kaur Kohli, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 171 days.

(21) Appl. No.: 16/015,423

(22) Filed: Jun. 22, 2018

(65) Prior Publication Data

US 2019/0392363 A1 Dec. 26, 2019

(51) Int. Cl.
G06Q 10/06 (2012.01)
G06Q 50/04 (2012.01)
G06N 20/00 (2019.01)

(52) U.S. Cl.
CPC ....... G06Q 10/06312 (2013.01); G06N 20/00 (2019.01); G06Q 50/04 (2013.01)

(58) Field of Classification Search
CPC .. G06Q 10/06312; G06Q 50/04; G06N 20/00; G06N 3/02; G06N 3/08; G06N 5/00; G06N 20/20; G06N 7/005
See application file for complete search history.

(56) References Cited

U.S. PATENT DOCUMENTS

| 6,032,125 A | 2/2000 | Ando | |
| 7,216,086 B1* | 5/2007 | Grosvenor | G06Q 10/04 705/7.11 |
| 8,428,987 B2 | 4/2013 | Najmi et al. | |
| 8,989,887 B2* | 3/2015 | Stafford | G06Q 10/04 700/108 |
| 2010/0179930 A1* | 7/2010 | Teller | G06N 20/00 706/12 |
| 2013/0085801 A1* | 4/2013 | Sharpe | G06Q 10/06311 705/7.28 |

(Continued)

OTHER PUBLICATIONS

Shin, Hojung, W. C. Benton, and Minjoon Jun. "Quantifying suppliers' product quality and delivery performance: A sourcing policy decision model." Computers & Operations Research 36.8 (2009): 2462-2471 (Year: 2009).*

(Continued)

*Primary Examiner* — Matthew S Gart
*Assistant Examiner* — Hamzeh Obaid
(74) *Attorney, Agent, or Firm* — Lowenstein Sandler LLP

(57) ABSTRACT

Methods, systems, and non-transitory computer readable medium for predicting arrival time of components based on historical receipt data. A method includes receiving historical receipt data corresponding to features. The method further includes performing feature analysis to generate additional features for the historical receipt data. The method further includes selecting a first set of features including at least one of the additional features. The method further includes predicting, based on the first set of features, an arrival time for one or more components of a manufacturing facility. The method further includes causing, based on the predicted arrival time, modification of a schedule in a file associated with the one or more components of the manufacturing facility.

20 Claims, 7 Drawing Sheets

(56) References Cited

U.S. PATENT DOCUMENTS

| | | | |
|---|---|---|---|
| 2014/0018951 A1* | 1/2014 | Linton | G06N 5/02 700/105 |
| 2015/0088606 A1* | 3/2015 | Tyagi | G06Q 30/0202 705/7.31 |
| 2015/0120373 A1* | 4/2015 | Bajaj | G06Q 10/06315 705/7.25 |
| 2016/0196527 A1* | 7/2016 | Bose | G06Q 10/0832 705/332 |
| 2017/0262764 A1* | 9/2017 | Karuppasamy | G06Q 10/0631 |
| 2018/0012166 A1* | 1/2018 | Devadas | G06Q 10/06315 |
| 2018/0089591 A1* | 3/2018 | Zeiler | G06F 8/00 |
| 2018/0101814 A1* | 4/2018 | Nadella | G06N 5/04 |
| 2018/0260769 A1* | 9/2018 | Ahmed | G06Q 10/087 |
| 2018/0276695 A1* | 9/2018 | Dione | G06Q 10/08 |
| 2018/0365634 A1* | 12/2018 | Clem | G06Q 10/0833 |
| 2019/0206007 A1* | 7/2019 | Leach | G06F 16/23 |

OTHER PUBLICATIONS

Ensemble pruning via individual contribution ordering Z Lu, X Wu, XZhu.J Bongard—Proceedings of the 16th ACM SIGKDD . . . 2010-dl.acm.org (Year: 2010).*

Stefanovic, Nenad. "Proactive supply chain performance management with predictive analytics." The Scientific World Journal 2014 (2014). (Year: 2014).*

Lingitz, Lukas, et al. "Lead time prediction using machine learning algorithms: A case study by a semiconductor manufacturer." PROCEDIACIRP 72 (2018): 1051-1056. (Year: 2018).*

Wang, Juite, and Yun-Feng Shu. "Fuzzy decision modeling for supply chain management." Fuzzy Sets and systems 150.1 (2005): 107-127. (Year: 2005).*

Shih, Stephen C., et al. "Knowledge sharing—A key role in the downstream supply chain." Information & management 49.2 (2012): 70-80. (Year: 2012).*

* cited by examiner

PREDICTING ARRIVAL TIME OF COMPONENTS BASED ON HISTORICAL RECEIPT DATA

TECHNICAL FIELD

The present disclosure relates to predicting arrival time of components, and, more particularly, predicting arrival time of components based on historical receipt data.

BACKGROUND

Lead times provided by suppliers of components are often inaccurate and either include overly optimistic timelines or extra buffer time for suppliers. Components that arrive early at a facility (e.g., a semiconductor manufacturing facility) take up valuable inventory space. Components that arrive late lead to costly expedited shipping.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method may include receiving historical receipt data corresponding to a plurality of features and performing, by a processing device, feature analysis to generate a plurality of additional features for the historical receipt data. The method may further include selecting a first set of features comprising at least one of the plurality of additional features. The method may further include predicting, based on the first set of features, an arrival time for one or more components of a manufacturing facility. The method may further include causing, based on the predicted arrival time, modification of a schedule in a file associated with the one or more components of the manufacturing facility.

BRIEF DESCRIPTION OF THE DRAWINGS

The present disclosure is illustrated by way of example, and not by way of limitation in the figures of the accompanying drawings.

DETAILED DESCRIPTION

Figure 1:
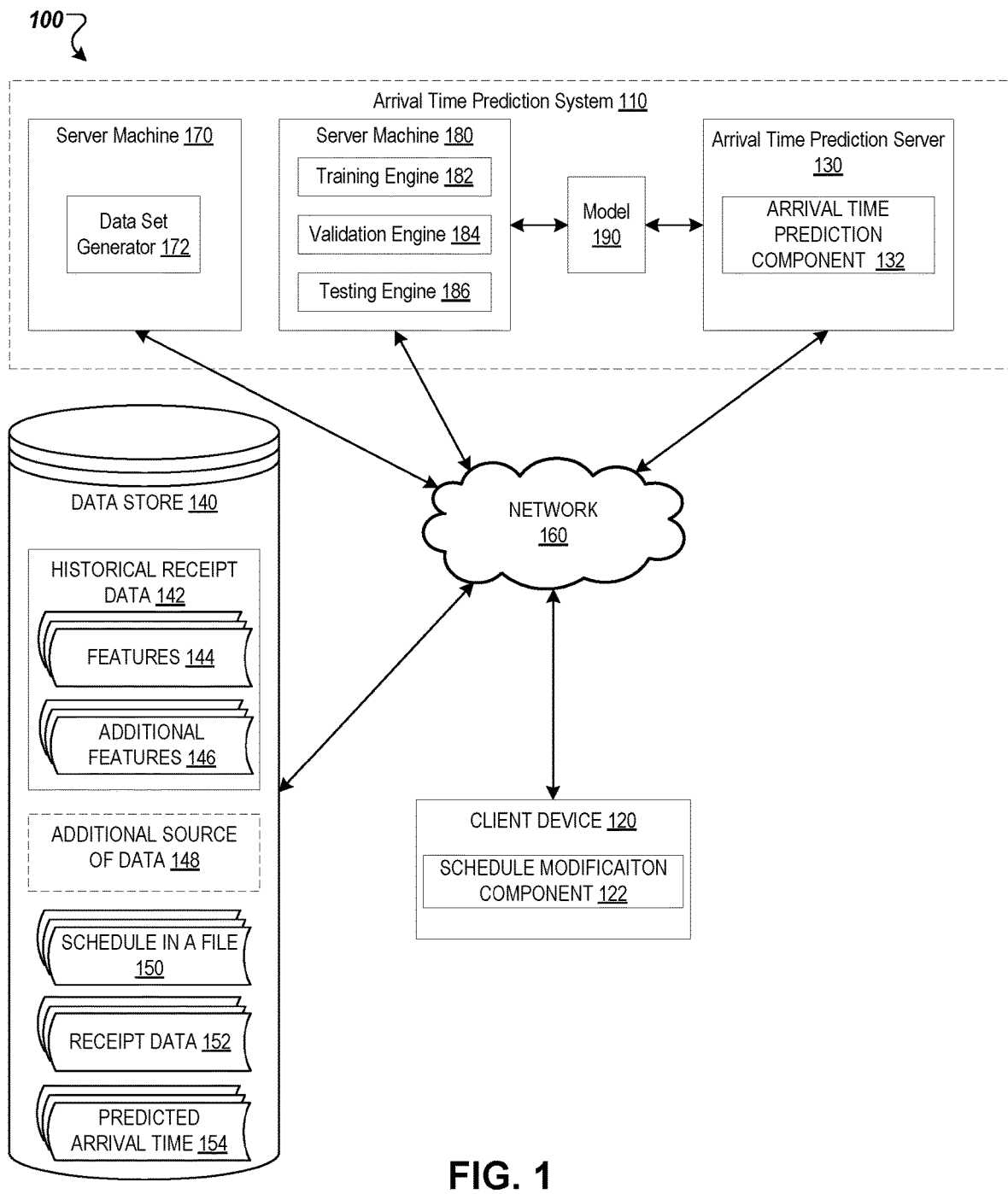
FIG. 1 is a block diagram illustrating an exemplary system architecture, according to certain embodiments.

Described herein are technologies directed to predicting arrival time of components based on historical receipt data. A client device associated with a facility (e.g., manufacturing facility) may transmit, to a supplier device associated with a supplier, a file associated with a schedule including a date for an order placement for one or more components. The facility may have an expected delivery date for a component. The facility may use the component to manufacture products (e.g., process semiconductor substrates), to repair or update equipment, to form a manufacturing system, etc. A client device may set the date of the order placement based on static rules-based calculations on component and plant location combinations to attempt to receive the component by an expected delivery date. For example, the client device may access a database that stores static information for calculating a first lead time for first components from a first supplier and for calculating a second lead time for second components from a second supplier. The lead times generated using static rules-based calculations may produce inaccurate arrival times of the components.

The devices, systems, and methods disclosed herein predict arrival time of components based on historical receipt data. A processing device receives historical receipt data that corresponds to features (e.g., part information, vendor information, etc.). The processing device performs feature analysis (e.g., feature engineering) to generate additional features for the historical receipt data. The additional features may include one or more of type of component, capacity of supplier of the component, week of fiscal year the component was ordered or arrived, number of times the component was ordered from the same supplier, number of standard deviations away from the mean order in a fiscal quarter, frequency of occurrences of the component in the historical receipt data, etc. The processing device selects a first set of features including at least one of the additional features and predicts, based on the first set of features, an arrival time for one or more components of a manufacturing facility. The processing device causes, based on the predicted arrival time, modification of a schedule of a file (e.g., an open purchase order file) associated with the one or more components of the manufacturing facility.

Selecting of the first set of features may include generating multiple trained machine learning models, where each trained machine learning model is trained using a corresponding set of features of the historical receipt data. The most accurate trained machine learning model may be selected and it may be determined that the selected trained machine learning model corresponds to the first set of features. Predicting the arrival time of a component may including providing a schedule in a file (e.g., an open purchase order file) to the selected machine learning model and receiving output from the selected trained machine learning model of the predicted arrival time of the component. The trained machine learning model may be updated based on receipt data for the components corresponding to the predicted arrival times.

Aspects of the present disclosure result in technological advantages of significant reduction in energy consumption (e.g., battery consumption), bandwidth, latency, and so forth. In some embodiments, the technological advantages may result from a client device causing modification of a date of an order placement in a schedule of a file so that components of a manufacturing facility arrive at an expected delivery time. The client device causing the components to arrive at an expected delivery time eliminates the energy consumption, eliminates the reduction in bandwidth, and eliminates increase in latency associated with the client device determining inventory space responsive to components arriving early and the client device determining expedited shipping responsive to components arriving late.

FIG. 1 is a block diagram illustrating an exemplary system architecture 100, according to certain embodiments. The system architecture 100 includes client device 120, an arrival time prediction server 130, and a data store 140. The arrival time prediction server 130 may be part of an arrival time prediction system 110.

The client device 120, arrival time prediction server 130, data store 140, server machine 170, and server machine 180 may be coupled to each other via a network 160 for predicting arrival time of one or more components based on historical receipt data 142. In some embodiments, network 160 is a public network that provides client device 120 with access to the arrival time prediction server 130, data store 140, and other publically available computing devices. In some embodiments, network 160 is a private network that provides client device 120 with access to the arrival time prediction server 130, data store 140, and other privately available computing devices. Network 160 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

The client device 120 may include a computing device such as personal computers (PCs), laptops, mobile phones, smart phones, tablet computers, netbook computers, network connected televisions ("smart TV"), network-connected media players (e.g., Blu-ray player), a set-top-box, over-the-top (OTT) streaming devices, operator boxes, etc. The client device 120 may be capable of transmitting a schedule in a file 150 and receipt data 152 via network 160 and receiving predicted arrival time 154 via network 160. Client device 120 may modify the schedule in the file 150 based on the predicted arrival time 154. Each client device 120 may include an operating system that allows users to generate, view, and edit a schedule in a file 150.

The client device 120 may include a schedule modification component 122. Schedule modification component 122 may receive user input (e.g., via a graphical user interface displayed via the client device 120) and may generate, based on the user input, a schedule in a file 150 (e.g., an open purchase order file) including a date of an order placement for one or more components. In some embodiments, client device 120 transmits the schedule in a file 150 to arrival time prediction server 130 and the client device 120 receives the predicted arrival time 154 corresponding to the schedule in the file 150 from the arrival time prediction server 130. The client device 120 may generate receipt data 152 responsive to receiving the one or more components associated with the schedule in a file 150. The client device 120 may transmit the receipt data 152 to the arrival time prediction server 130 for the update of the trained machine learning model 190.

The arrival time prediction server 130 may include one or more computing devices such as a rackmount server, a router computer, a server computer, a personal computer, a mainframe computer, a laptop computer, a tablet computer, a desktop computer, etc. The arrival time prediction server 130 may include an arrival time prediction component 132. In some embodiments, the arrival time prediction component 132 may use historical receipt data 142 to predict arrival time of one or more components. In some embodiments, the arrival time prediction component 132 may use a trained machine learning model 190 to predict arrival time of one or more components. The trained machine learning model 190 may use a set of features selected from features 144 and additional features 146 of historical receipt data 142 for predicting arrival time.

The arrival time prediction component 132 may receive (e.g., retrieve from the data store 140) historical receipt data 142 corresponding to features 144, perform feature analysis to generate additional features 146 for the historical receipt data 142, and select a first set of features including at least one of the additional features 146. The arrival time prediction component 132 may generate a predicted arrival time 154 for one or more components based on the first set of features and may cause modification of a schedule in a file 150 associated with the one or more components (e.g., modify a date of order placement of the one or more components in a purchase order) based on the predicted arrival time. In some embodiments, the arrival time prediction component 132 causes the modification by transmitting the predicted arrival time 154 to the client device 120. In some embodiments, the arrival time prediction component 132 generates the predicted arrival time 154 responsive to receiving the schedule in the file 150 from the client device 120.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store one or more of historical receipt data 142 including features 144 and additional features 146, additional sources of data 148, instances of a schedule in a file 150, instances of receipt data 152, or instances of predicted arrival time 154. The historical receipt data 142 may include schedules in a file (e.g., purchase orders) and receipt data over a period of time. For example, the historical receipt data 142 may include purchase orders and corresponding receipt data over the course of a year. The historical receipt data 142 may include features 144 and additional features 146. The original historical receipt data 142 (e.g., schedules in files 150 and receipt data 152) may include features 144 (e.g., attributes such as delivery date, type of component, etc. for each component listed in the historical receipt data 142) and may not include additional features 146. The additional features may be generated by arrival time prediction component 132.

Each additional source of data 148 may include one or more of vendor information, part information, vendor-provided part delivery commitment dates, aggregated quality scorecards, capacity data, quality data, etc. In some embodiments, the additional features 146 are generated based on user input received via client device 120. In some embodiments, the additional features are generated by comparing or combining the historical receipt data 142 with one or more additional sources of data 148. Each schedule in a file 150 may be open purchase order. Each receipt data 152 may correspond to a schedule in a file 150 after the corresponding components arrived at the manufacturing facility.

In some embodiments, the client device 120 may store a schedule in a file 150 and receipt data 152 in the data store 140 and the arrival time prediction server 130 may retrieve the schedule in a file and the receipt data 152 from the data store 140. In some embodiments, the arrival time prediction server 130 may store predicted arrival time 154 in the data store 140 and the client device 120 may retrieve the predicted arrival time 154 from the data store 140.

In some embodiments, arrival time prediction system 110 further includes server machine 170 and server machine 180.

The server machines 170 and 180 may be one or more computing devices (such as a rackmount server, a router computer, a server computer, a personal computer, a mainframe computer, a laptop computer, a tablet computer, a desktop computer, etc.), data stores (e.g., hard disks, memories databases), networks, software components, or hardware components.

Server machine 170 includes a data set generator 172 that is capable of generating data sets (e.g., a set of data inputs and a set of target outputs) to train, validate, or test a machine learning model. Some operations of data set generator 172 are described in detail below with respect to FIGS. 3 and 8. The data set generator 172 may partition the historical receipt data 142 into a training set (e.g., sixty percent of the historical receipt data), a validating set (e.g., twenty percent of the historical receipt data), and a testing set (e.g., twenty percent of the historical receipt data). In some embodiments, the arrival time prediction component 132 generates multiple sets of features. For example a first set of features may correspond to each of the data sets (e.g., training set, validation set, and testing set) and a second set of features may correspond to each of the data sets.

Server machine 180 includes a training engine 182, a validation engine 184, and a testing engine 186. The training engine 182 may be capable of training a machine learning model 190 using one or more sets of features associated with the training set from data set generator 172. The training engine 182 may generate multiple trained machine learning models 190, where each trained machine learning model 190 corresponds to a distinct set of features of the training set.

The validation engine 184 may be capable of validating a trained machine learning model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained machine learning models 190 based on the corresponding sets of features of the validation set. The validation engine 184 may discard trained machine learning models 190 that have an accuracy that does not meet a threshold accuracy.

The testing engine 186 may be capable of testing a trained machine learning model 190 using a corresponding set of features of a testing set from data set generator 172. For example, a first trained machine learning model 190 that was trained using a first set of features of the training set may be tested using the first set of features of the testing set. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. The machine learning model 190 may use one or more of logistic regression, decision tree (e.g., see FIG. 2), or support vector machine (SVM). The machine learning model 190 may be composed of a single level of linear or non-linear operations (e.g., SVM) or may be a deep network (e.g., a machine learning model that is composed of multiple levels of non-linear operations).

Arrival time prediction component 132 may provide current data (e.g., a schedule in a file 150, an open purchase order) as input to trained machine learning model 190 and may run trained machine learning model 190 on the input to obtain one or more outputs. As described in detail below with respect to FIG. 7, arrival time prediction component 132 may be capable of extracting a predicted arrival time 154 from the output of the trained machine learning model 190 and extracting confidence data from the output that indicates a level of confidence that the one or more components are to arrive at the predicted arrival time 154. The arrival time prediction component 132 may use the confidence data to decide to cause modification of the schedule in the file 150 (e.g., change a date of an order placement for the one or more components) based on the predicted arrival time 154.

The confidence data may include or indicate a level of confidence of one or more components arriving at the predicted arrival time 154. In one example, the level of confidence is a real number between 0 and 1 inclusive, where 0 indicates no confidence of the one or more components arriving at the predicted arrival time 154 and 1 indicates absolute confidence of the one or more components arriving at the predicted arrival time 154.

In some embodiments, the schedule in the file 150 may include features (e.g., corresponding to the features 144 of historical receipt data 142). The arrival time prediction server 130 may perform feature analysis to generate additional features (e.g., corresponding to additional features 146 of historical receipt data 142). The arrival time prediction server 130 may select a first set of features of the schedule in the file 150 (e.g., corresponding to a first set of features of the historical receipt data 142 used to train the machine learning model 190) and may provide the first set of features of the schedule in the file 150 to the trained machine learning model 190.

For purpose of illustration, rather than limitation, aspects of the disclosure describe the training of a machine learning model and use of a trained learning model using information pertaining to historical receipt data 142 to determine a predicted arrival time 154 for one or more components. In other implementations, a heuristic model or rule-based model is used to determine an arrival time 154. Arrival time prediction component may monitor historical receipt data 142. Any of the information described with respect to data inputs 310 of FIG. 3 may be monitored or otherwise used in the heuristic or rule-based model.

In some embodiments, the functions of client device 120, arrival time prediction server 130, server machine 170, and server machine 180 may be provided by a fewer number of machines. For example, in some embodiments server machines 170 and 180 may be integrated into a single machine, while in some other embodiments server machine 170, server machine 180, and arrival time prediction server 130 may be integrated into a single machine.

In general, functions described in one embodiment as being performed by client device 120, arrival time prediction server 130, server machine 170, and server machine 180 can also be performed on arrival time prediction server 130 in other embodiments, if appropriate. In addition, the functionality attributed to a particular component can be performed by different or multiple components operating together. For example, in some embodiments, the arrival time prediction server 130 may modify the schedule in a file 150 based on the prediction arrival time 154. In another example, client device 120 may select the first set of features of the historical receipt data 142.

In addition, the functions of a particular component can be performed by different or multiple components operating together. One or more of the arrival time prediction server 130, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of arrival times of components in manufacturing facilities (e.g., semiconductor manufacturing facilities), embodiments may also be generally applied to arrival times. Embodiments may be generally applied to optimizing supply chain (e.g., shipment and/or receipt of components).

Figure 2:
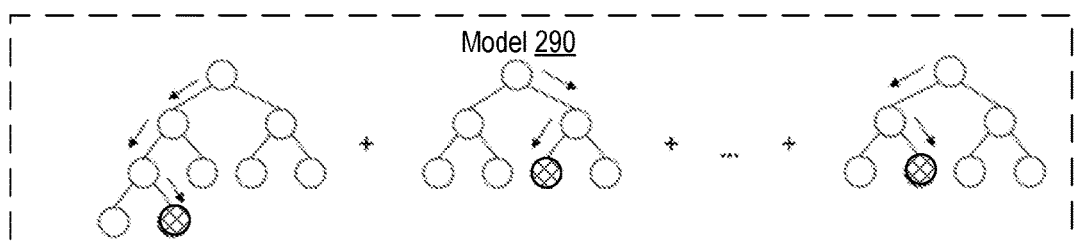
FIG. 2 is an example block diagram of a model for determining a set of features for predicting arrival time

FIG. 2 is an example block diagram of a model 290 (e.g., model 190 of FIG. 1) for determining a set of features for predicting arrival time, according to certain embodiments. In some embodiments, model 290 may use gradient boosting to determine a set of features for predicting arrival time.

Given historical labeled training data (e.g., in supervised learning), the model 290 may output a gradient boosted decision tree classification model which categorizes new samples. The gradient boosted decision tree classification model may use a two-class classification problem to determine the predicted arrival time. For example, the predicted arrival time may be "class 0" (early) if the component is expected to arrive before or on the expected delivery date (e.g., published date) and "class 1" (late) if the component is expected to arrive after the expected delivery date (e.g., published date).

Gradient boosting builds an ensemble of trees one-by-one and then the predictions of the individual trees are summed by the following equation:

$$D(x)=d_{tree1}(x)+d_{tree2}(x)+\ldots$$

The variable D(x) may be the current prediction (e.g., a generic prediction). The variable d(x) may be an individual decision tree. Each decision tree may be used to determine one or more features for the set of features for predicting arrival time.

The next decision tree, $d_{tree4}(x)$, tries to cover the discrepancy between the target function, f(x), (e.g., target output 320 of FIG. 3) and the current ensemble prediction by reconstructing the residual using the following equation:

$$D(x)+d_{tree4}(x)=f(x)$$

To get closer to the destination, the tree may be trained to reconstruct the difference between the target function and the current predictions of an ensemble which is called the residual, R(x), using the following equation:

$$R(x)=f(x)-D(x)$$

The model 290 may eliminate residuals, R(x), one by one (e.g., based on failures in the decision trees, based on a feature indicated by a decision tree not correctly predicting the target function) until there are no residuals and the remaining decision trees indicate the features that form the set of features for predicting arrival time.

The description of gradient boosting to determine a set of features to predict arrival time is illustrative, but not limiting. In some embodiments, a different type of machine learning may be used (e.g., by model 190 of FIG. 1, by model 290 of FIG. 2). In some embodiments, the machine learning model determines a set of features for predicting as a regression problem. In some embodiments, the machine learning model determines a set of features for predicting backorder cost instead of part delivery. In some embodiments, the machine learning model uses long short-term memory (LSTM) (e.g., recurrent neural network). In some embodiments, the machine learning model uses unsupervised learning methods. In some embodiments, the machine learning model uses multi-variate regression. In some embodiments, classification algorithms for regression problems may be used by discretizing a target value (e.g., target output 320 of FIG. 3). In some embodiments, machine learning models may be combined to improve predictive power.

Figure 3:
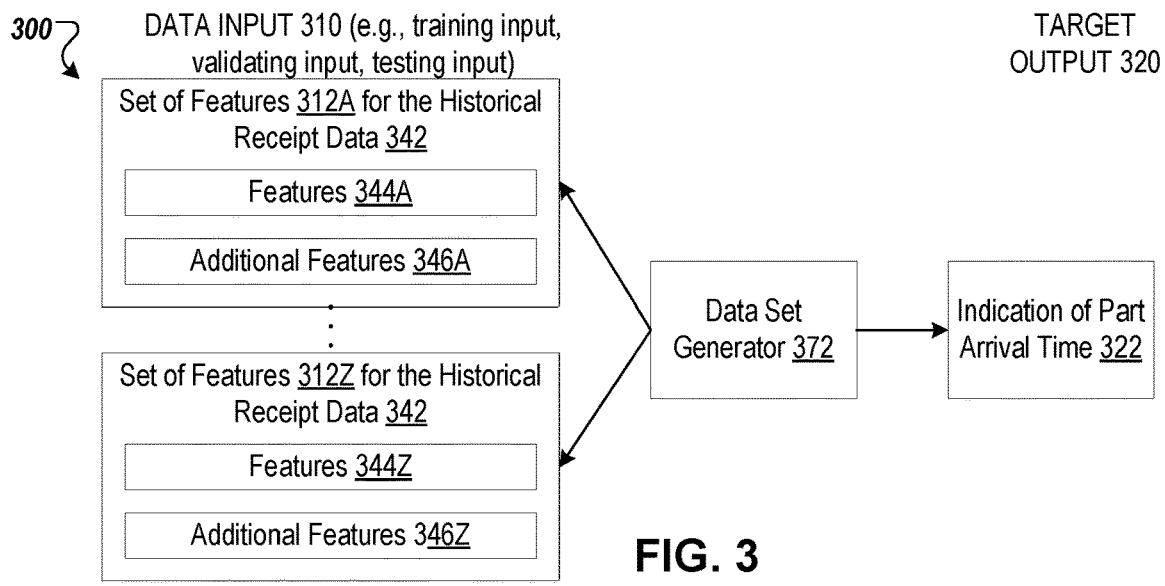
FIG. 3 is an example data set generator to create data sets for a machine learning model using historical receipt data, according to certain embodiments.

FIG. 3 is an example data set generator 372 (e.g., data set generator 172 of FIG. 1) to create data sets for a machine learning model 390 (e.g., model 190 of FIG. 1) using historical receipt data 342 (e.g., historical receipt data 142 of FIG. 1), according to certain embodiments. System 300 of FIG. 3 shows data set generator 372, data inputs 310, and target outputs 320.

In some embodiments, data set generator 372 generates a data set (e.g., training set, validating set, testing set) that includes one or more data inputs 310 (e.g., training input, validating input, testing input) and one or more target outputs 320. The data set may also include mapping data that maps the data inputs 310 to the target outputs 320. Data inputs 310 may also be referred to as "features," "attributes," or "information." In some embodiments, data set generator 372 may provide the data set to the training engine 182, validating engine 184, or testing engine 186, where the data set is used to train, validate, or test the machine learning model 190. Some embodiments of generating a training set may further be described with respect to FIG. 8.

In some embodiments, data inputs 310 may include one or more sets of features 312A for the historical receipt data 342. Each set of features 312 may include at least one of a feature 344 (e.g., feature 144 of FIG. 1) or an additional feature 346 (e.g., addition feature 146 of FIG. 1).

In some embodiments, data set generator 372 may generate a first data input 310A corresponding to a first set of features 312A to train, validate, or test a first machine learning model and the data set generator 372 may generate a second data input 310B corresponding to a second set of features 312B to train, validate, or test a second machine learning model.

In some embodiments, the data set generator 372 may discretize the target output 320 (e.g., to use in classification algorithms for regression problems). Discretization of the target output 320 may transform continuous values of variables into discrete values. In some embodiments, the discrete values for the target output 320 indicate whether the component arrived on time or late. In some embodiments, the discrete values for the target output 320 indicate whether the component arrived on early or late. In some embodiments, the discrete values for the target output 320 indicate how many days early or late the component arrived. In some embodiments, the expected arrival date (e.g., of a set of features 312 of data input 310) may be adjusted (e.g., by data set generator 372 to determine target output 320, by arrival time prediction component 132 in determining the predicted arrival time 154) one day at a time until the target output indicates that the component arrived on time (e.g., the predicted arrival time switches between "class 1" (late) and "class 0" (early)). The quantity of days that the expected arrival date was adjusted may indicate how many days early or how many days late the component arrived or is predicted to arrive. In some embodiments, the discrete values for the target output 320 indicate a cost associated with how early (e.g., inventory cost) or how late (e.g., expedited shipment cost) the component arrives. In some embodiments, the expected arrival time is adjusted until the target output indicates that the component arrived on time to determine a quantity of days the component arrived early or a quantity of days the component arrived early late and then a cost associated with the amount of days early or late may be calculated (e.g., by the data set generator 172 to determine target output 320, by arrival time prediction component 132 in determining the predicted arrival time 154, by client device 120, etc.).

Data inputs 310 and target outputs 320 to train, validate, or test a machine learning model may include information for a particular facility (e.g., for a particular semiconductor manufacturing facility). For example, the historical receipt data 342 may be for the same manufacturing facility as the file in a schedule and receipt data. In some embodiments, the information used to train the machine learning model may be from specific groups of components of the manufacturing facility having specific characteristics (e.g., components from a specific timeframe, components for a specific type of manufacturing equipment, etc.) and allow the trained machine learning model to determine outcomes for a specific group of components based on input for a certain schedule in a file associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing machine learning model 190 using the data set, the machine learning model 190 may be further trained, validated, or tested (e.g., using additional data for a data set) or adjusted (e.g., adjusting weights associated with input data of the machine learning model 190, such as connection weights in a neural network) using receipt data (e.g., receipt data 152) for one or more components corresponding to a schedule in a file.

Figure 4:
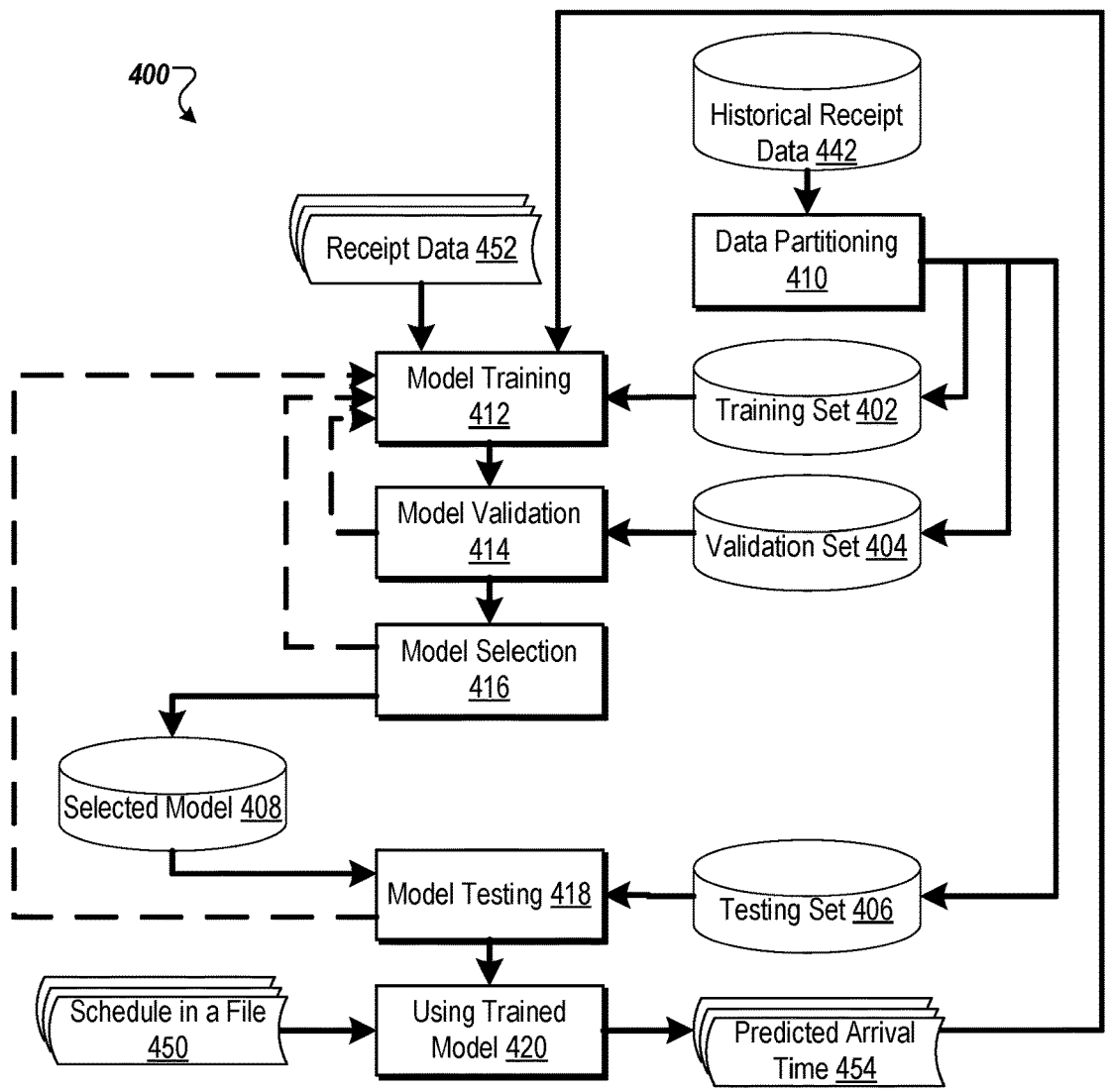
FIG. 4 is a block diagram illustrating generating predicted arrival time, according to certain embodiments.

FIG. 4 is a block diagram illustrating a system 400 for generating predicted arrival time, according to certain embodiments. The system 400 may be a feedback system for predicting part arrival time in supply chain based on historical receipt data.

At block 410, the system 400 (e.g., arrival time prediction system 110 of FIG. 1) performs data partitioning (e.g., via data set generator 172 of server machine 170 of FIG. 1) of the historical receipt data 442 (e.g., historical receipt data 142 of FIG. 1) to generate the training set 402, validation set 404, and testing set 406. In some embodiments, the system 400 generates a plurality of sets of features corresponding to each of the data sets.

At block 412, the system 400 performs model training (e.g., via training engine 182 of FIG. 1) using the training set 402. The system 400 may train multiple models using multiple sets of features of the training set 402 (e.g., a first set of features of the training set 402, a second set of features of the training set 402, etc.).

At block 414, the system 400 performs model validation (e.g., via validation engine 184 of FIG. 1) using the validation set 404. The system 400 may validate each of the trained models using a corresponding set of features of the validation set 404. At block 414, the system may determine an accuracy of each of the one or more trained models and may determine whether one or more of the trained models has an accuracy that meets a threshold accuracy. Responsive to determining that none of the trained models has an accuracy that meets a threshold accuracy, flow returns to block 412 where the system 400 performs model training using different sets of features of the training set. Responsive to determining that one or more of the trained models has an accuracy that meets a threshold accuracy, flow continues to block 416.

At block 416, the system 400 performs model selection to determine which of the one or more trained models that meet the threshold accuracy has the highest accuracy (e.g., the selected model 408). Responsive to determining that two or more of the trained models that meet the threshold accuracy have the same accuracy, flow may return to block 412 where the system 400 performs model training using further refined training sets corresponding to further refined sets of features for determining a trained model that has the highest accuracy.

At block 418, the system 400 performs model testing (e.g., via testing engine 186 of FIG. 1) using the testing set 406 to test the selected model 408. At block 418, the system 400 may determine whether accuracy of the selected model 408 meets a threshold accuracy using the testing set 406. Responsive to accuracy of the selected model 408 not meeting the threshold accuracy (e.g., the selected model 408 is overly fit to the validation set 404), flow continues to block 412 where the system 400 performs model training using different training sets corresponding to different sets of features. Responsive to determining that the selected model 408 has an accuracy that meets a threshold accuracy based on the testing set 406, flow continues to block 420. In at least block 412, the model may learn patterns in the historical receipt data to make predictions and in block 418, the system 400 may apply the model on the remaining data (e.g., testing set 406) to test the predictions.

At block 420, system 400 uses the trained model (e.g., selected model 408) to receive a schedule in a file 450 (e.g., schedule in a file 150 of FIG. 1, open purchase order file) associated with components of a manufacturing facility and to output a predicted arrival time 454 (e.g., predicted arrival time 154 of FIG. 1) of the components.

Responsive to receiving receipt data 452 corresponding to the components associated with the predicted arrival time 454, flow may continue to block 412 (e.g., via a feedback loop) where the predicted arrival time 454 and the receipt data 452 are compared to update the trained model via model training.

FIGS. 5-8 are flow diagrams illustrating example methods 500-800 associated with modifying a schedule in a file (e.g., schedule in a file 150 of FIG. 1) associated with one or more components, according to certain embodiments. Methods 500-800 be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In one embodiment, methods 500-800 may be performed, in part, by arrival time prediction system 110. In some embodiments, methods 500-800 may be performed by arrival time prediction server 130. In some embodiments, a non-transitory storage medium stores instructions that when executed by a processing device (e.g., of arrival time prediction system 110) cause the processing device to perform methods 500-800.

For simplicity of explanation, methods 500-800 are depicted and described as a series of acts. However, acts in accordance with this disclosure can occur in various orders and/or concurrently and with other acts not presented and described herein. Furthermore, not all illustrated acts may be performed to implement the methods 500-800 in accordance with the disclosed subject matter. In addition, those skilled in the art will understand and appreciate that the methods 500-800 could alternatively be represented as a series of interrelated states via a state diagram or events.

Figure 5:
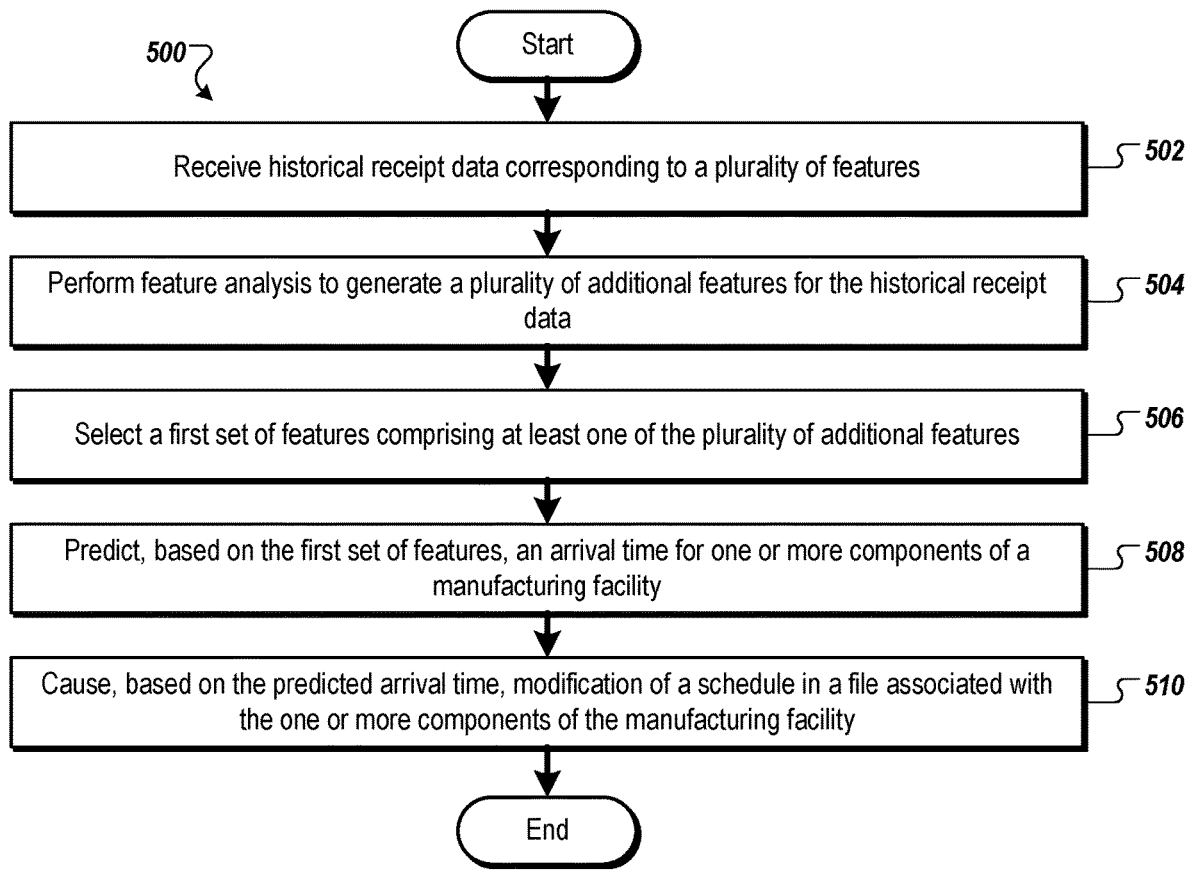
FIGS. 5-8 are flow diagrams illustrating example methods of modifying a schedule in a file associated with one or more components, according to certain embodiments.

FIG. 5 is a flow diagram of a method 500 for causing modification of a schedule in a file (e.g., schedule in a file 150 of FIG. 1) associated with one or more components (e.g., of a manufacturing facility), according to certain embodiments.

Referring to FIG. 5, at block 502 the processing logic receives historical receipt data (e.g., historical receipt data 142) corresponding to a plurality of features. The historical receipt data may include data from previous schedules in a file (e.g., purchase orders) and corresponding receipt data. The historical receipt data may include a list of components (e.g., that were ordered via a purchase order and subsequently received) and a plurality of features (e.g., attributes) for each component. A feature may include data in a field. For example, a first component may be a heating assembly and the corresponding features may be a corresponding expected delivery date, a corresponding actual delivery date, a corresponding manufacturer location, etc. A second component may be an electrostatic chuck and the corresponding features may be a corresponding expected delivery date, a corresponding actual delivery date, a corresponding manufacturer location, etc.

At block 504, the processing logic performs feature analysis (e.g., feature engineering) to generate a plurality of additional features for the historical receipt data. In some embodiments, the processing logic combines the features with an additional source of data (e.g., additional source of data 148) to generate additional features. In some embodiments, the processing logic compares the features with an additional source of data (e.g., additional source of data 148) to generate additional features. In some embodiments, the processing logic compares the two or more features to each other to generate additional features. For example, a first feature may be a corresponding expected delivery date and a second feature may be a corresponding actual delivery date. The processing logic may compare the first feature and the second feature to generate an additional feature of the difference between the expected delivery date and the actual delivery date. In some embodiments, the processing logic may receive user input indicating one or more additional features (e.g., an indication of which features or which feature and additional source of data to combine or compare to generate the additional feature).

At block 506, the processing logic selects a first set of features (e.g., performs feature selection, performs signal extraction) including at least one additional feature. In some embodiments, the processing logic selects the first set of features responsive to user input indicating the first set of features. In some embodiments, the processing logic may rank the features by amount of influence on the component arrival time and select a set of features that have the highest amount of influence (e.g., the highest ranked features).

At block 508, the processing logic predicts, based on the first set of features, an arrival time for one or more components of a manufacturing facility. In some embodiments, the predicted arrival time is an indication of whether the one or more components are to arrive after an expected delivery date (e.g., a two-class classification problem). For example, the predicted arrival time may be "class 0" (early) if the component is expected to arrive before or on the expected delivery date (e.g., published date) and "class 1" (late) if the component is expected to arrive after the expected delivery date (e.g., published date). In some embodiments, the predicted arrival time is an indication of a how many days early or late that a component is expected to arrive (e.g., a first quantity of days before an expected delivery date or a second quantity of days after the expected delivery date that the one or more components are to arrive). In some embodiments, the predicted arrival time is an indication of cost associated with a first quantity of days before the expected delivery date (e.g., inventory cost associated with arriving five days early) or a second quantity of days after the expected delivery date (e.g., expedited shipping cost to send the completed product to the customer associated with the component arriving two days late) that the one or more components are to arrive. In some embodiments, the predicted arrival time comprises one or more of model performance metrics, model predictions, or prediction aggregations.

At block 506, the processing logic causes, based on the predicted arrival time, modification of a schedule in a file associated with the one or more components of the manufacturing facility. In some embodiments, to cause the modification of the schedule, the processing logic is to change, in the schedule, a date of an order placement for the one or more components.

Figure 6:
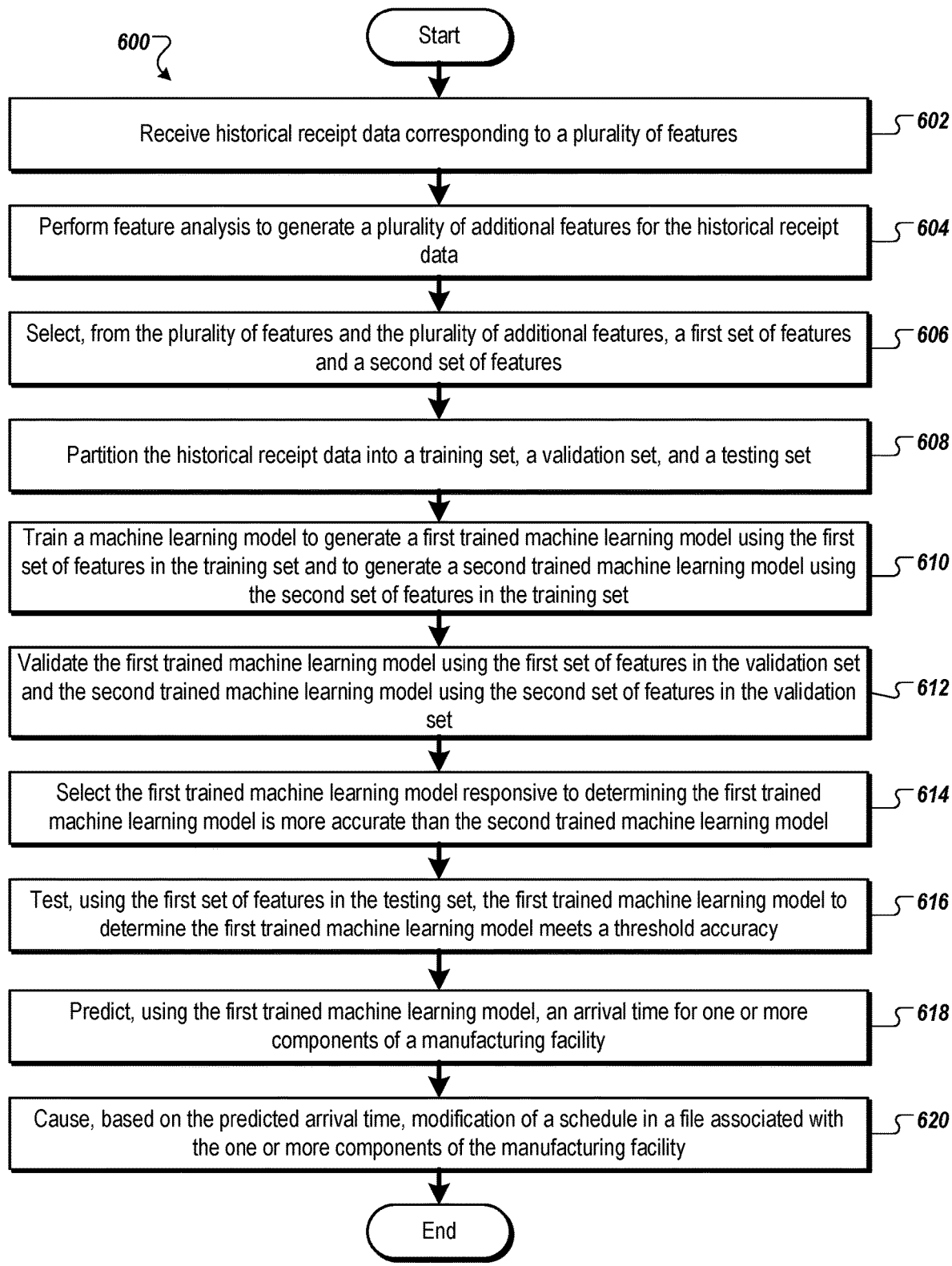

FIG. 6 is a flow diagram of a method 600 for using a first machine learning model to determine a predicted arrival time, according to certain embodiments.

Referring to FIG. 6, at block 602 the processing logic receives historical receipt data corresponding to a plurality of features. Block 602 may be similar to block 502 of FIG. 5.

At block 604, the processing logic performs feature analysis to generate a plurality of additional features for the historical receipt data. Block 604 may be similar to block 504 of FIG. 5.

At block 606, the processing logic selects, from the plurality of features and the plurality of additional features, a first set of features and a second set of features. In some embodiments, the processing logic may select the sets of features based on user input. In some embodiments, the processing logic selects different sets of features based on sets of features used by previous trained machine learning models. In some embodiments, the processing logic generates sets of features corresponding to different combinations of the plurality of features and the additional features.

At block 608, the processing logic partitions the historical receipt data into a training set, a validation set, and a testing set. For example, the training set may be 60% of the historical receipt data, the validation set may be 20% of the historical receipt data, and the validation set may be 20% of the historical receipt data. The processing logic may generate a plurality of sets of features for each of the training set, the validation set, and the testing set. For example, if the historical receipt data has 100 components (e.g., parts of a manufacturing facility) and 10 attributes for each component (e.g., type of part, supplier identifier, expected arrival time, actual arrival time, etc.), a first set of features may be features 1-5, a second set of features may be features 6-10, the training set may be components 1-60, the validation set may be components 61-80, and the testing set may be components 81-100. In this example, the first set of features of the training set would be features 1-5 of components 1-60.

At block 610, the processing logic trains a machine learning model to generate a first trained machine learning model using the first set of features in the training set (e.g., features 1-5 of components 1-60) and to generate a second trained machine learning model using the second set of features in the training set (e.g., features 6-10 of components 1-60). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., first set of features being features 1-5 and second set of features being features 4-10). In some embodiments, hundreds of models may be generated including models with various permutations of features and combinations of models.

At block 612, the processing logic validates the first trained machine learning model using the first set of features in the validation set (e.g., features 1-5 of components 61-80) and the second trained machine learning model using the second set of features in the validation set (e.g., features 6-10 of components 61-80). In some embodiments, the processing logic may validate hundreds of models (e.g., models with various permutations of features, combinations of models, etc.) generated at block 610. In some embodiments, the processing logic determines a corresponding accuracy of each of the trained machine learning models. The processing logic may discard the trained machine learning models that have an accuracy that is below a first threshold accuracy (e.g., based on the validation set).

At block 614, the processing logic selects the first trained machine learning model responsive to determining, based on the validating, the first trained machine learning model is more accurate than the second trained machine learning model. The processing logic may further select the first trained machine learning model based on the corresponding accuracies of the trained machine learning models (e.g., responsive to determining that the first trained machine learning model has the highest accuracy of the trained machine learning models).

At block 616, the processing logic tests, using the first set of features in the testing set (e.g., features 1-5 of components 81-100), the first trained machine learning model to determine the first trained machine learning model meets a second threshold accuracy (e.g., based on the first set of features of the testing set). Responsive to the first trained machine learning model not meeting the second threshold accuracy based on the testing set, flow may continue to block 610 to retrain the machine learning model based on different features (e.g., the machine learning model may have been overly fit to the training and/or validation set and not applicable to other data sets such as the testing set). Responsive to the first trained machine learning model meeting the second threshold accuracy based on the testing set, flow may continue to block 618.

At block 618, the processing logic predicts, using the first trained machine learning model based on the first set of features, an arrival time for one or more components of a manufacturing facility. Block 618 may be similar to block 508 of FIG. 5.

At block 620, the processing logic causes, based on the predicted arrival time, modification of a schedule in a file associated with the one or more components of the manufacturing facility. In some embodiments, to cause the modification of the schedule, the processing logic is to change, in the schedule, a date of an order placement for the one or more components. Block 620 may be similar to block 510 of FIG. 5.

Figure 7:
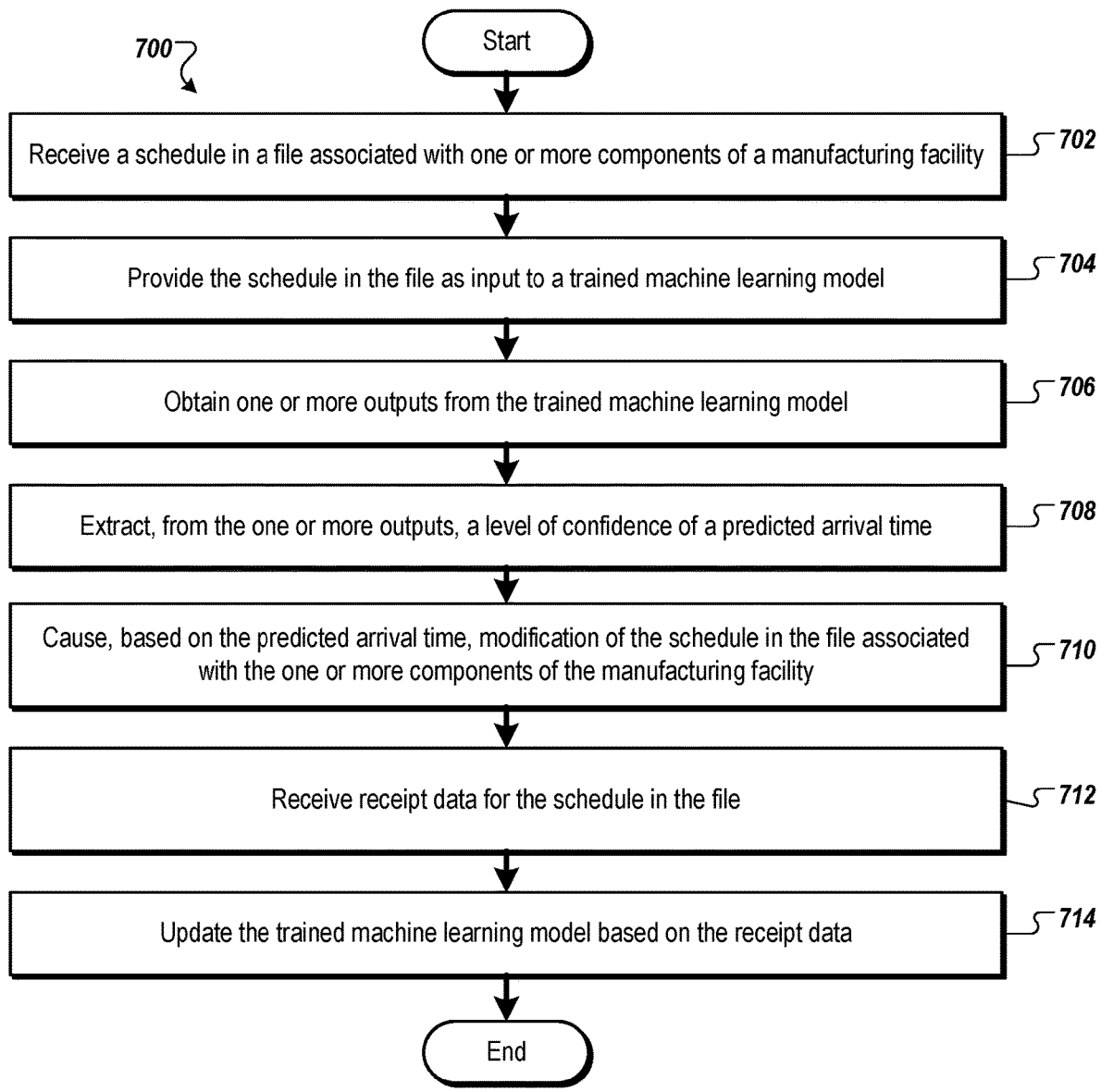

FIG. 7 is a flow diagram of a method 700 for updating the trained machine learning model for determining a predicted arrival time, according to certain embodiments.

Referring to FIG. 7, at block 702 the processing logic receives a schedule in a file (e.g., schedule in a file 150 of FIG. 1, an open purchase order file) associated with one or more components of a manufacturing facility.

At block 704, the processing logic provides the schedule in the file associated with the one or more components of the manufacturing facility as input to a trained machine learning model (e.g., trained machine learning model 190 of FIG. 1). In some embodiments, the processing logic generates additional features for the schedule in the file and provides the first set of features (corresponding to the trained machine learning model) of the schedule in the file as the input to the trained machine learning model.

At block 706, the processing logic obtains one or more outputs (e.g., target outputs 320 of FIG. 3) from the trained machine learning model.

At block 708, the processing logic extracts, from the one or more outputs, a predicted arrival time (e.g., predicted arrival time 154) and a level of confidence that the one or more components will arrive at the predicted arrival time. The processing logic may determine whether the level of confidence meets a threshold level of confidence. Responsive to the level confidence meeting the threshold level of confidence, flow may continue to block 710.

At block 710, the processing logic causes, based on the predicted arrival time, modification of a schedule in a file associated with the one or more components of the manufacturing facility. In some embodiments, to cause the modification of the schedule, the processing logic is to change, in the schedule, a date of an order placement for the one or more components.

At block 712, the processing logic receives receipt data (e.g., receipt data 152 of FIG. 1) for the schedule in the file. The receipt data may indicate the actual arrival time of the one or more components at the manufacturing facility.

At block 714, the processing logic updates the trained machine learning model based on the receipt data. In some embodiments, responsive to the receipt data differing from the predicted arrival time (e.g., the predicting being incorrect), the processing logic may update the trained machine learning data with the schedule in a file and the receipt data (e.g., storing the correct response in the historical receipt data). The processing logic may generate additional features corresponding to the schedule in the file and the receipt data. The processing logic may update the trained machine learning model (e.g., re-train, re-validate, and/or re-test) based on the first set of features of the updated historical receipt data (e.g., including the first set of features corresponding to the schedule in the file and receipt data).

Figure 8:
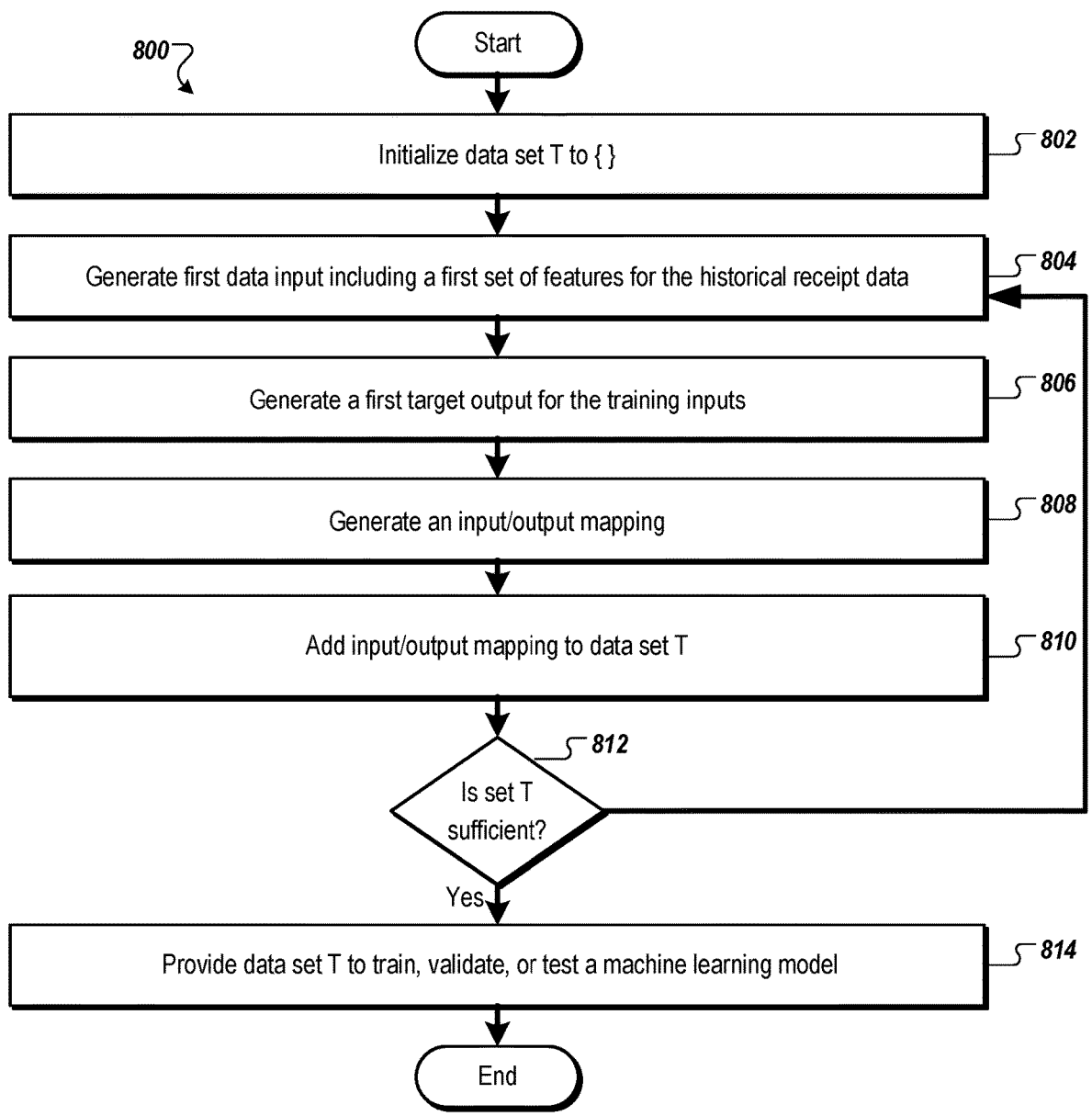

FIG. 8 is a flow diagram of a method 800 for generating a data set for a machine learning model for determining a predicted arrival time, according to certain embodiments. Arrival time prediction system 110 may use method 800 to at least one of train, validate, or test a machine learning model, in accordance with embodiments of the disclosure. In some embodiments, one or more operations of method 800 may be performed by data set generator 172 of server machine 170 as described with respect to FIGS. 1 and 3. It may be noted that components described with respect to FIGS. 1 and 3 may be used to illustrate aspects of FIG. 8

Referring to FIG. 8, in some embodiments, at block 802 the processing logic implementing method 800 initializes a training set T to an empty set.

At block 804, processing logic generates first data input (e.g., first training input, first validating input) that includes a first set of features for the historical receipt data (as described with respect to FIG. 2). The first data input may include one or more features and/or one or more additional features of historical receipt data. In some embodiments, the processing logic generates a second data input comprising one or more additional sources of data. In some embodiments, the processing logic generates a third data input comprising one or more instances of a schedule in a file and corresponding receipt data.

At block 806, processing logic generates a first target output for one or more of the data inputs (e.g., first data input). The first target output provides an indication of a predicted arrival time of one or more components of a manufacturing facility.

At block 808, processing logic optionally generates mapping data that is indicative of an input/output mapping. The input/output mapping (or mapping data) may refer to the data input (e.g., one or more of the data inputs described herein), the target output for the data input (e.g., where the target output identifies a predicted arrival time), and an association between the data input(s) and the target output.

At block 810, processing logic adds the mapping data generated at block 810 to data set T.

At block 812, processing logic branches based on whether data set T is sufficient for at least one of training, validating, or testing machine learning model 190. If so, execution proceeds to block 814, otherwise, execution continues back at block 804. It should be noted that in some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 814, processing logic provides data set T to train, validate, or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 310) are input to the neural network, and output values (e.g., numerical values associated with target outputs 320) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 814, machine learning model (e.g., machine learning model 190) can be at least one of trained using training engine 182 of server machine 180, validated using validating engine 184 of server machine 180, or tested using testing engine 186 of server machine 180. The trained machine learning model may be implemented by arrival time prediction component 132 (of arrival time prediction server 130) to predict an arrival time for one or more components based on a schedule in a file.

Figure 9:
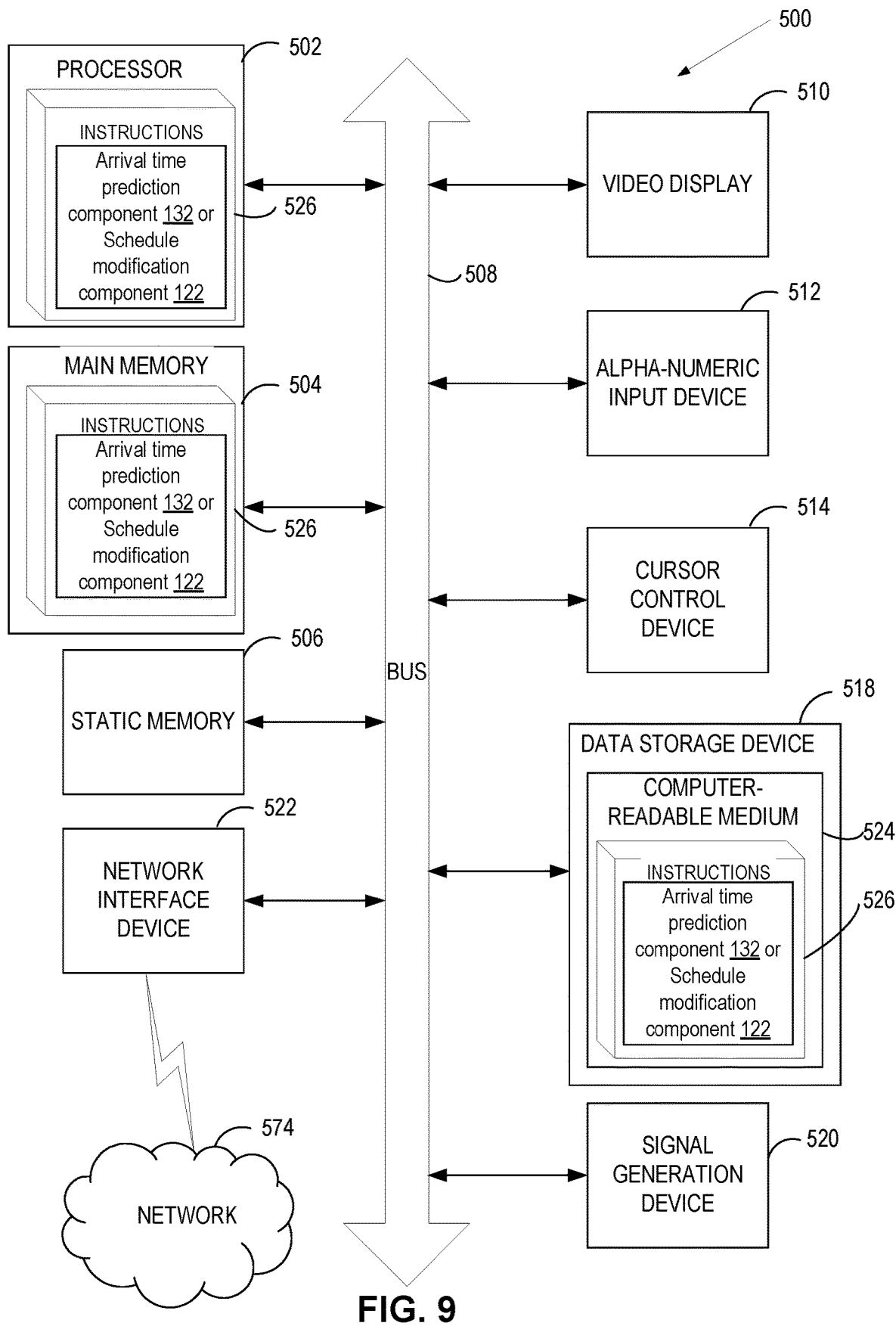
FIG. 9 is a block diagram illustrating a computer system, according to certain embodiments.

FIG. 9 is a block diagram illustrating a computer system 900, according to certain embodiments. In some embodiments, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., random access memory (RAM)), a non-volatile memory 906 (e.g., read-only memory (ROM) or electrically-erasable programmable ROM (EEPROM)), and a data storage device 916, which may communicate with each other via a bus 908.

Processing device 902 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 900 may further include a network interface device 922. Computer system 900 also may include a video display unit 910 (e.g., an LCD), an alphanumeric input device 912 (e.g., a keyboard), a cursor control device 914 (e.g., a mouse), and a signal generation device 920.

In some implementations, data storage device 916 may include a non-transitory computer-readable storage medium 924 on which may store instructions 926 encoding any one or more of the methods or functions described herein, including instructions encoding the arrival time prediction component 132 or schedule modification component 122 of FIG. 1 and for implementing methods described herein.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "selecting," "predicting," "causing," "changing," "generating," "partitioning," "training," "validating," "testing," "providing," "obtaining," "extracting," "determining," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving historical receipt data associated with historical components transported to one or more manufacturing facilities, wherein the historical receipt data comprises a plurality of features associated with the historical components;
performing, by a processing device, feature analysis to generate a plurality of additional features for the historical receipt data, a first set of features and a second set of features being selected from at least one of the plurality of features or the plurality of additional features, a first trained machine learning model being trained using the first set of features, and a second trained machine learning model being trained using the second set of features;
in view of the first set of features and the second set of features and testing accuracy of at least the first trained machine learning model, determining to use the first trained machine learning model, and providing a schedule in a file associated with one or more components of a manufacturing facility as input to the first trained machine learning model;
obtaining one or more outputs from the first trained machine learning model;
generating, based on the one or more outputs, an updated schedule in the file;
directing shipment of the one or more components to the manufacturing facility based on the updated schedule; and
responsive to receiving first receipt data associated with the one or more components of the manufacturing facility, causing the first trained machine learning model to be further trained to be used to generate a subsequent schedule associated with subsequent components.

2. The method of claim 1, wherein the generating of the updated schedule comprises changing, in the schedule, a date of an order placement for the one or more components.

3. The method of claim 1, wherein generating the plurality of additional features comprises manipulating the historical receipt data in view of an additional source of data.

4. The method of claim 1, wherein generating the plurality of additional features is responsive to receiving user input indicating the plurality of additional features.

5. The method of claim 1 further comprising:
selecting the first set of features and the second set of features;
partitioning the historical receipt data into a training set, a validation set, and a testing set;
training a machine learning model to generate the first trained machine learning model using the first set of features in the training set and to generate the second trained machine learning model using the second set of features in the training set;
validating the first trained machine learning model using the first set of features in the validation set and the second trained machine learning model using the second set of features in the validation set;
selecting the first trained machine learning model responsive to determining, based on the validating, the first trained machine learning model is more accurate than the second trained machine learning model; and
testing, using the first set of features in the testing set, the first trained machine learning model to determine the first trained machine learning model meets a threshold accuracy, wherein the first trained machine learning model uses one or more of logistic regression, decision tree, or support vector machine (SVM).

6. The method of claim 1 further comprising:
extracting, from the one or more outputs, a level of confidence of a predicted arrival time, wherein the generating of the updated schedule in the file associated with the one or more components of the manufacturing facility is responsive to the level of confidence meeting a threshold level of confidence.

7. The method of claim 6 further comprising:
determining that the first receipt data differs from the predicted arrival time; and
updating the first trained machine learning model based on the first receipt data.

8. The method of claim 6 further comprising training a machine learning model to generate the first trained machine learning model, the training comprising:
generating training data for the machine learning model, wherein the generating of the training data comprises:

generating first training input comprising the first set of features for the historical receipt data; and generating a first target output for the first training input, wherein the first target output comprises an indication of a corresponding arrival time from the historical receipt data; and providing the training data to train the machine learning model on the first training input and the first target output.

9. The method of claim 1, wherein the one or more outputs are associated with a prediction of whether the one or more components are to arrive after an expected delivery date.

10. The method of claim 1, wherein the one or more outputs are associated with a prediction of a first quantity of days before an expected delivery date or a second quantity of days after the expected delivery date that the one or more components are to arrive.

11. The method of claim 1, wherein the one or more outputs are associated with a prediction of a cost associated with a first quantity of days before an expected delivery date or a second quantity of days after the expected delivery date that the one or more components are to arrive.

12. A system comprising:
a memory; and
a processing device, coupled to the memory, to:
receive historical receipt data associated with historical components transported to one or more manufacturing facilities, wherein the historical receipt data comprises a plurality of features associated with the historical components;
perform feature analysis to generate a plurality of additional features for the historical receipt data, a first set of features and a second set of features being selected from at least one of the plurality of features or the plurality of additional features, a first trained machine learning model being trained using the first set of features, and a second trained machine learning model being trained using the second set of features;
in view of the first set of features and the second set of features and testing accuracy of at least the first trained machine learning model, determine to use the first trained machine learning model, and provide a schedule in a file associated with one or more components of a manufacturing facility as input to the first trained machine learning model;
obtain one or more outputs from the first trained machine learning model;
generate, based on the one or more outputs, an updated schedule in the file;
direct shipment of the one or more components to the manufacturing facility based on the updated schedule; and
responsive to receiving first receipt data associated with the one or more components of the manufacturing facility, cause the first trained machine learning model to be further trained to be used to generate a subsequent schedule associated with subsequent components.

13. The system of claim 12, wherein to generate the updated schedule, the processing device is to change, in the schedule, a date of an order placement for the one or more components.

14. The system of claim 12, wherein the system is to:
select the first set of features and the second set of features;

partition the historical receipt data into a training set, a validation set, and a testing set;
train a machine learning model to generate the first trained machine learning model using the first set of features in the training set and to generate the second trained machine learning model using the second set of features in the training set;
validate the first trained machine learning model using the first set of features in the validation set and the second trained machine learning model using the second set of features in the validation set;
select the first trained machine learning model responsive to determining, based on the validating, the first trained machine learning model is more accurate than the second trained machine learning model; and
test, using the first set of features in the testing set, the first trained machine learning model to determine the first trained machine learning model meets a threshold accuracy.

15. The system of claim 12, wherein the processing device is further to:
extract, from the one or more outputs, a level of confidence of a predicted arrival time, wherein the processing device is to generate the updated schedule in the file associated with the one or more components of the manufacturing facility responsive to the level of confidence meeting a threshold level of confidence;
determine that the first receipt data differs from the predicted arrival time; and
update the first trained machine learning model based on the first receipt data.

16. The system of claim 15, wherein the system is further to train a machine learning model to generate the first trained machine learning model, wherein to train the machine learning model, the system is to:
generate training data for the machine learning model, wherein to generate the training data, the system is to:
generate first training input comprising the first set of features for the historical receipt data; and
generate a first target output for the first training input, wherein the first target output comprises an indication of a corresponding arrival time from the historical receipt data; and
provide the training data to train the machine learning model on the first training input and the first target output.

17. A non-transitory computer readable medium having instructions stored thereon, which, when executed by a processing device, cause the processing device to:
receive historical receipt data associated with historical components transported to one or more manufacturing facilities, wherein the historical receipt data comprises a plurality of features associated with the historical components;
perform feature analysis to generate a plurality of additional features for the historical receipt data, a first set of features and a second set of features being selected from at least one of the plurality of features or the plurality of additional features, a first trained machine learning model being trained using the first set of features, and a second trained machine learning model being trained using the second set of features;
in view of the first set of features and the second set of features and testing accuracy of at least the first trained machine learning model, determine to use the first trained machine learning model, and provide a schedule in a file associated with one or more components of a manufacturing facility as input to the first trained machine learning model;

obtain one or more outputs from the first trained machine learning model;

generate, based on the one or more outputs, an updated schedule in the file;

direct shipment of the one or more components to the manufacturing facility based on the updated schedule; and responsive to receiving first receipt data associated with the one or more components of the manufacturing facility, cause the first trained machine learning model to be further trained to be used to generate a subsequent schedule associated with subsequent components.

18. The non-transitory computer readable medium of claim 17, wherein to generate the updated schedule, the processing device is to change, in the schedule, a date of an order placement for the one or more components.

19. The non-transitory computer readable medium of claim 17, wherein to generate the plurality of additional features, the processing device is to manipulate the historical receipt data in view of an additional source of data.

20. The non-transitory computer readable medium of claim 17, wherein the processing device is further to:

extract, from the one or more outputs, a level of confidence of a predicted arrival time, wherein the processing device is to generate the updated schedule in the file associated with the one or more components of the manufacturing facility responsive to the level of confidence meeting a threshold level of confidence;

determine that the first receipt data differs from the predicted arrival time; and update the first trained machine learning model based on the first receipt data.

* * * * *